(12) United States Patent
Northcott et al.

(10) Patent No.: US 8,243,133 B1
(45) Date of Patent: Aug. 14, 2012

(54) SCALE-INVARIANT, RESOLUTION-INVARIANT IRIS IMAGING USING REFLECTION FROM THE EYE

(75) Inventors: Malcolm J. Northcott, Felton, CA (US); J. Elon Graves, Los Gatos, CA (US); Dan Potter, Campbell, CA (US)

(73) Assignee: AOptix Technologies, Inc., Campbell, CA (US)

( * ) Notice: Subject to any disclaimer, the term of this patent is extended or adjusted under 35 U.S.C. 154(b) by 431 days.

(21) Appl. No.: 12/493,899

(22) Filed: Jun. 29, 2009

Related U.S. Application Data (60) Provisional application No. 61/076,622, filed on Jun. 28, 2008.

(51) Int. Cl.
*H04N 9/47* (2006.01)
*H04N 7/18* (2006.01)

(52) U.S. Cl. ........................................................ 348/78

(58) Field of Classification Search ............... 345/77, 345/78, 345, 348
See application file for complete search history.

(56) References Cited

U.S. PATENT DOCUMENTS

| | | | | |
|---|---|---|---|---|
| 4,193,667 A * | 3/1980 | Yasukuni et al. | ............. | 359/688 |
| 6,643,390 B1 * | 11/2003 | Clark et al. | ............. | 382/124 |
| 7,020,308 B1 * | 3/2006 | Shinzaki et al. | ............. | 382/124 |
| 2005/0002078 A1 * | 1/2005 | Boettcher | ............. | 359/224 |
| 2005/0041133 A1 * | 2/2005 | Weigel | ............. | 348/335 |
| 2006/0140454 A1 * | 6/2006 | Northcott et al. | ............. | 382/117 |

* cited by examiner

*Primary Examiner* — Mehrdad Dastouri
*Assistant Examiner* — Kristin Dobbs
(74) *Attorney, Agent, or Firm* — Fenwick & West LLP (57) ABSTRACT

An optical system includes an active focus element that maintains an image in focus over a range of object distances. The active focus element and aperture stop are positioned such that the image scale and the image spatial resolution are also invariant (or at least have a reduced sensitivity) with respect to object distance.

17 Claims, 7 Drawing Sheets

SCALE-INVARIANT, RESOLUTION-INVARIANT IRIS IMAGING USING REFLECTION FROM THE EYE

CROSS-REFERENCE TO RELATED APPLICATION(S)

This application claims priority under 35 U.S.C. §119(e) to U.S. Provisional Patent Application Ser. No. 61/076,622, "Scale-Invariant, Resolution-Invariant Iris Imaging Using Reflection From The Eye," filed Jun. 28, 2008 by Malcolm J. Northcott, et al. The subject matter of the foregoing is incorporated herein by reference in its entirety.

BACKGROUND OF THE INVENTION

1. Field of the Invention

This invention relates to imaging systems where the image resolution and image scale do not vary over a range of object distances, for example as may be used in systems that image human irises.

2. Background

As traditional forms of personal identification become vulnerable to advancing technology, biometric identification is increasingly seen as a viable approach to personal identification. Techniques such as voice recognition, fingerprinting, and iris imaging rely on physical personal traits that are difficult to change or duplicate.

Biometric identification via iris imaging relies on capturing images of a person's iris and then matching the captured image against a database of previously acquired iris information. In order for this approach to be effective, the subject's iris image must be captured with a certain amount of resolution. Low resolution images do not provide enough information to uniquely match against the database. Furthermore, in many applications, it is desirable to capture iris images from many subjects quickly, without requiring excessive user cooperation, and from a distance.

For example, it may be desirable to capture iris images of every person funneling through an entranceway in an airport. Thus, an iris imaging system may continuously scan a certain volume in front of the entranceway (the capture volume), capturing iris images of the people in that volume. Larger capture volumes are generally preferred.

However, larger capture volumes mean that the subjects will be located at widely varying object distances from the camera capturing the iris images. In a conventional imaging system, the back focus distance grows as the object moves closer to the lens. This results in an increased optical magnification which means that the size of the image formed at the camera's image plane (i.e., the image scale) varies with the object distance. The same size iris will produce an image that is larger when the subject is closer to the camera and smaller when the subject is farther from the camera. In addition, the resolution of the camera, when measured in units of length at the image plane, may also vary with the object distance. This complicates the subsequent image processing. The varying scale means that the captured image must be rescaled to properly match the iris images in the database. The varying resolution means that features used to distinguish one iris from another may be blurred relative to the iris images in the database. The varying image size means that the image detector must be sized to accommodate the largest image, which can drive the use of a significantly larger image detector than would be needed for a fixed focus device.

Thus, there is a need for iris imaging systems that eliminate or at least reduce this image scale and/or image resolution variation as a function of object distance to the subject.

SUMMARY OF THE INVENTION

The present invention overcomes the limitations of the prior art by providing an optical system where the image scale and the image spatial resolution are invariant (or at least have a reduced sensitivity) with respect to object distance.

In one aspect of the invention, such an optical system is used in an iris imaging system. The iris imaging system includes a camera that captures images of irises within a predefined capture volume with sufficient resolution for biometric identification. The camera includes an optical system that images an iris to an image plane located at a fixed position, and with an image scale and an image spatial resolution that is constant regardless of a standoff distance to the iris. A sensor array located at the image plane captures the image of the iris.

One particular class of designs includes an active focus element (e.g., a deformable mirror controlled by an adaptive optics loop) that auto-focuses the image of the iris onto the image plane. In one particular design, the active focus element also acts as the aperture stop for the optical system (or an aperture stop is located at the active focus element) and the active focus element is located at a back infinite conjugate focal plane of the optical system. This geometry yields invariance of image scale and image spatial resolution with respect to object distance, over a predetermined focus range.

The active focus element and aperture stop can be moved from the invariance position. Small deviations will yield an optical system that is not perfectly invariant with respect to object distance but which still has reduced sensitivity to object distance.

The image scale invariance and constant image spatial resolution mean that iris images can be captured under approximately the conditions regardless of where in the capture volume the iris is located. The constant image scale means that the same iris will always occupy approximately the same number of pixels on the sensor array, regardless of the object distance. The constant image spatial resolution means that approximately the same frequency band of information is captured, regardless of the object distance. Systems that are not perfectly invariant but have reduced sensitivity to object distances can in many cases still reap the majority of these benefits.

In an example iris imaging system, the system may capture images of irises with a spatial resolution somewhere in the range of approximately 75 to 200 microns, as measured at the iris (i.e., object space resolution). The image scale preferably results in approximately 200 to 300 pixels across the iris image. Capture volumes of at least 1 cubic meter can be realized, maximum standoff distances of approximately 5 to 10 m, and sufficient speed to acquire and image one iris per second, would not be uncommon requirements for many applications.

Other aspects of the invention include the optical system itself, other applications for such an optical system, and methods corresponding to all of the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
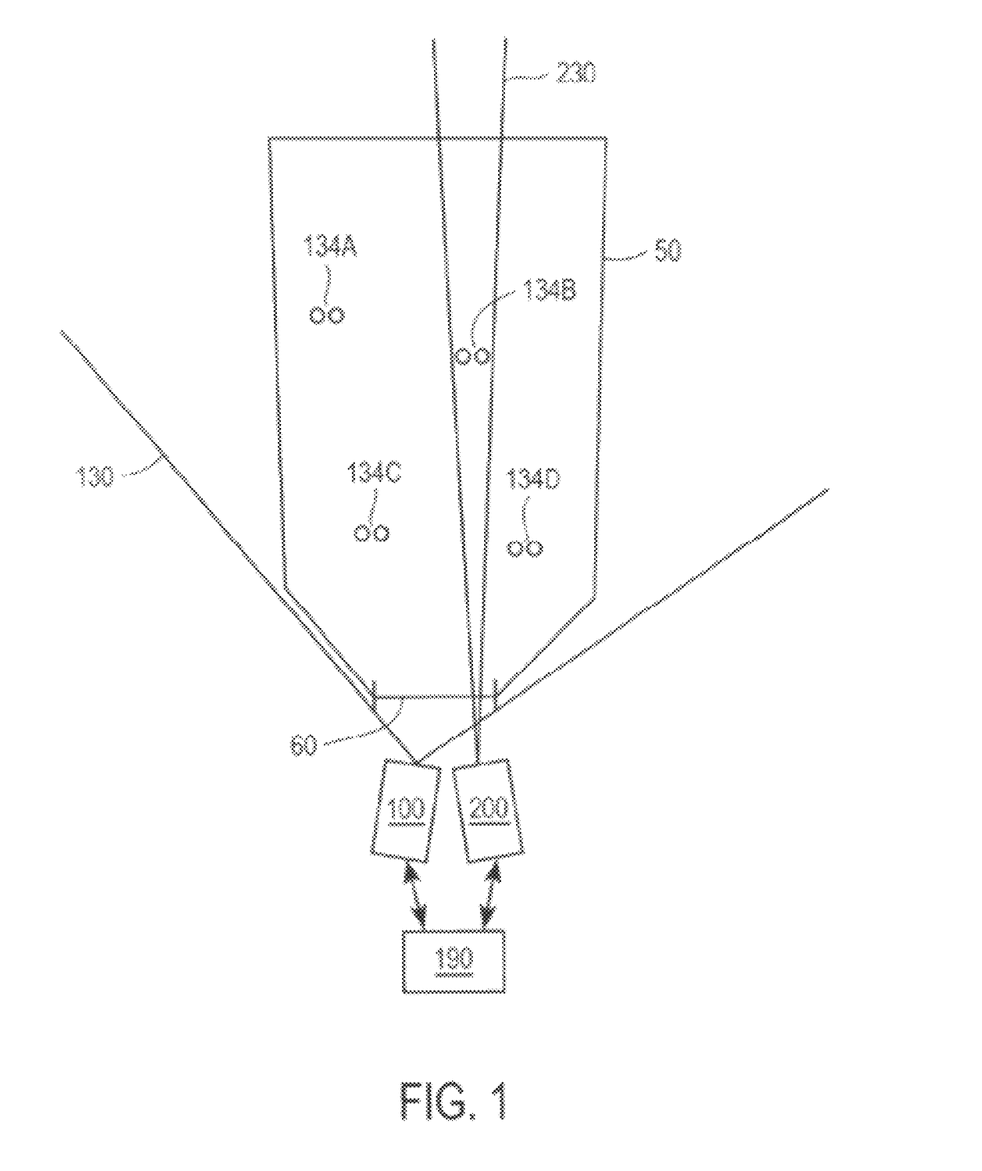
FIG. 1 is an illustration of an iris imaging system, in accordance with an embodiment.

FIG. 1 is an illustration of an iris imaging system. The iris imaging system includes an imaging subsystem 200 and, optionally, an acquisition subsystem 100. The system is designed to capture iris images of many eyes 134 over a large capture volume 50, typically with minimal cooperation, or possibly without the active cooperation of the subjects. In one application, the subjects are passing through a portal 60 (such as a doorway or metal detector), the capture volume 50 is the entranceway leading up to the portal, and the iris imaging system captures iris images as the subjects pass through the capture volume. Typically in such a scenario the user would be requested to briefly stop in the capture volume to scan a card, wait for access doors to open, or wait for a signal from a guard or from an indicator screen. In many applications, the capture volume can be defined based on a portal or other bottleneck for the flow of people. Examples include corridors, turnstiles, toll booths, elevator doors, escalators and parking garage entrances. Other examples include checkout lines or other queues, crosswalks, sidewalks and roadways.

This situation may be "uncooperative," meaning that the subjects are not actively cooperating in the iris imaging. For example, they are not placing their heads into a device to allow capture of iris images. However the concept of operation of a complete security system usually requires a minimum level of cooperation from the subject. It is the aim of the iris recognition system to require a minimum amount of cooperative effort above what is required to deal with the rest of the security setup. A typical setup requires some level of person tracking so the access control mechanism (doors, guard or simply record keeper) can be assured that a particular recognition applies to a particular person. The prevention of drafting (allowing access to multiple people based on 1 recognition event) also requires some level of cooperation.

The imaging subsystem 200 captures the iris images for each subject. However, in order to obtain sufficient resolution in the iris image, the imaging subsystem 200 has a fairly narrow field of view 230. Therefore, in order to cover the entire capture volume, the imaging subsystem 200 is actively steered from one subject to the next. Coarse tracking of subjects can be achieved in many different ways. In FIG. 1, an acquisition subsystem 100 with a wide field of view 130 is used to identify the approximate location of each subject. This information is used to coarsely steer the imaging subsystem 200 to the general vicinity of the subject. Once in the general vicinity, fine tracking and focus is achieved by illuminating the subject's eye with an optical beam, and steering and focusing the imaging subsystem 200 to the eye based on a reflection from the subject's eye. Examples of eye reflections include retro-reflection from the retina and glint reflection from the corneal surface. The tracking and focus occur fairly rapidly in real-time if a large capture volume and throughput of subjects is to be accommodated.

Furthermore, as will be described in greater detail below, the focus accommodation and placement of the aperture stop are implemented in a manner so that the captured iris image has constant image scale (i.e., image size) and constant spatial resolution at the image plane (image spatial resolution) regardless of the distance to the subject 134. That is, irises 134 for subjects at the front of the capture volume 50 are captured with the same image scale and spatial resolution as irises 134 for subjects at the back of the capture volume. In some designs, the image scale and/or spatial resolution may not be perfectly constant but the variation as a function of object distance is at least reduced. Note that constant image scale will be achieved if the optical system has a constant optical magnification. In addition, if the optical system has a constant optical magnification, then constant spatial resolution as measured in object space will result in constant spatial resolution in image space. "Spatial resolution" is resolution defined in terms of length, as opposed to angular resolution, for example.

Returning to FIG. 1, different devices can be used for the acquisition subsystem 100 and for the imaging subsystem 200. The acquisition subsystem 100 can also be based on tracking subjects using reflection from their eyes. Alternately, it can be based on completely different mechanisms. For example, the acquisition subsystem 100 might capture conventional digital images of the capture volume. Software is then used to identify which parts of each captured image represent humans and/or which part of each human is his face or eyes. Frame to frame comparisons can be used to track movement of subjects. Stereoscopic systems (based on eye reflection, conventional imaging or other approaches) can be used to triangulate subject positions within the capture volume.

In FIG. 1, the acquisition subsystem 100 is shown as a single box with a wide field of view 130. This is merely a representation. The acquisition subsystem 100 is not limited to a single box. In the stereoscopic example, equipment is positioned at different locations in order to capture different viewpoints. Even if a stereoscopic approach is not used, multiple cameras can still be used advantageously, for example to more efficiently cover the entire capture volume 50.

The wide field of view 130 also need not be implemented literally as shown in FIG. 1. Each acquisition camera(s) may have a wide field of view that covers the entire capture volume 50, as shown in FIG. 1. Alternately, each acquisition camera may cover less than the entire capture volume 50, but the cameras together cover the entire capture volume 50. In addition, the cameras may be scanning rather than staring and their instantaneous fields of view may be smaller than the capture volume 50. At any instant in time, only a fraction of the entire capture volume is covered but, over time, the entire capture volume is covered.

As a final example, the acquisition subsystem 100 may not be based on cameras at all. Other types of position sensors or intrusion sensors may be used to determine the location of subjects. For example, the capture volume 50 may be covered by a grid of light beams. The position of subjects is determined by the subjects' breaking the light beams. In a different approach, floor mounted pressure pads may be used to determine subject positions. Sonar, radar, lidar, and thermal detection or imaging are examples of other technologies that can be used to determine subject positions. For certain types of sensors, the term "field of view" may not even be applicable, so long as the acquisition subsystem 100 is sufficient to cover the capture volume 50.

Controller 190 coordinates the two subsystems. The information from the acquisition subsystem 100 is used by the imaging subsystem 200 (via controller 190) to coarsely steer the narrow field of view 230 from subject to subject. As with the acquisition subsystem 100, many different designs for the imaging subsystem 200 are also possible. In one approach, conventional devices such as steering mirrors or gimbals are used to coarsely steer the narrow field of view 230 to the subject 134. An adaptive optics system (not shown in FIG. 1) is then used to achieve fast, fine tracking of the subject 134 and also focus adjustment for the image capture. The adaptive optics system is driven by the eye reflection from the subject's eye 134 and/or by other position and distance measurement techniques. Other approaches can also be used. Liquid crystal phased arrays and real time holograms are examples of other steering and focusing devices. Other signal sources could include glints, parallax using images or eye reflections, and time of flight lidar, image contrast and multiple or single aperture correlation tracking.

Figure 2:
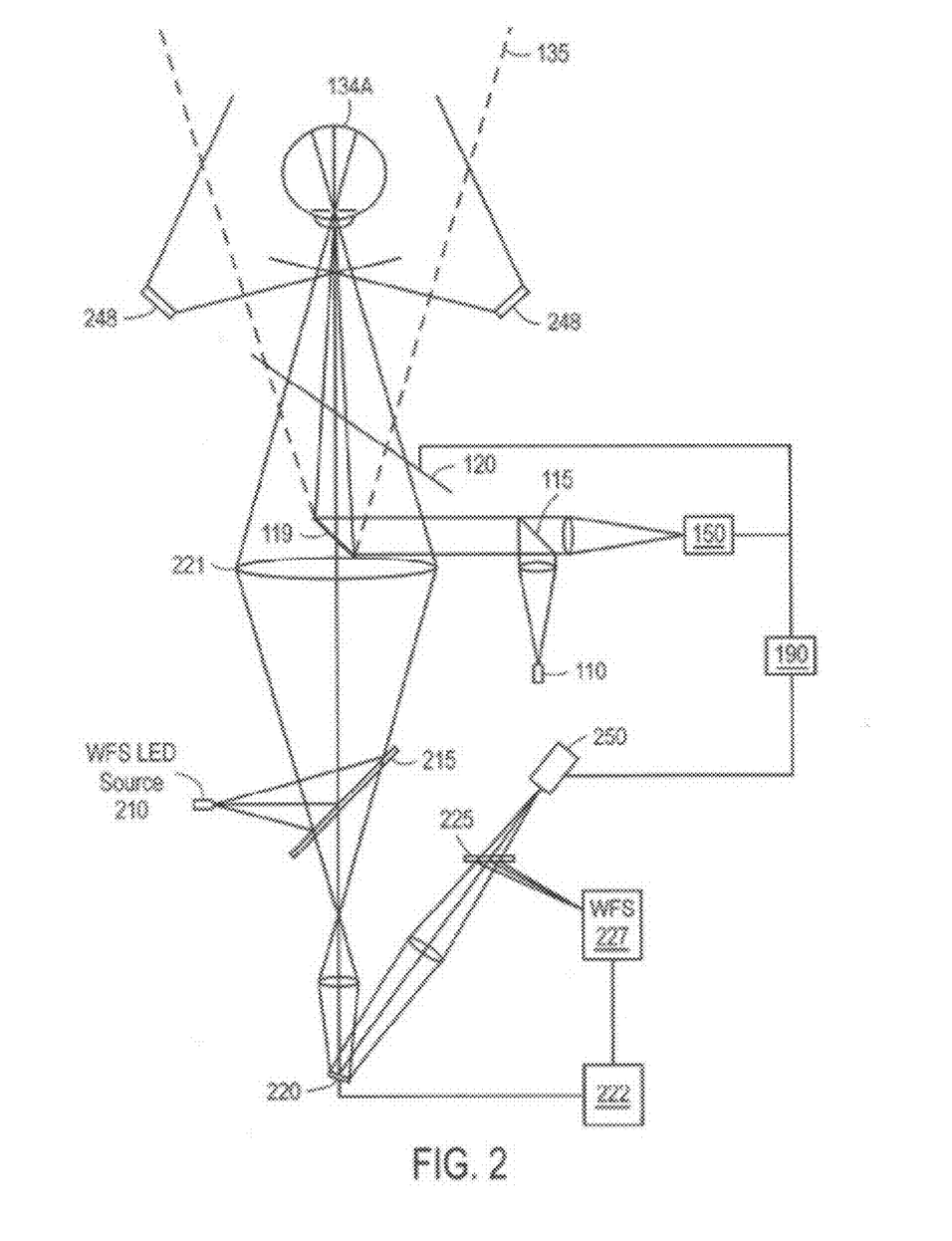
FIG. 2 is an illustration of another iris imaging system, in accordance with an embodiment of the invention.

FIG. 2 is an illustration of an example iris imaging based on retro-reflection from the eye. In this example, the acquisition subsystem 100 includes a light source 110, a beam splitter 115, a small "pickoff" mirror 119 and a camera 150. The imaging subsystem 200 includes a light source 210, a beamsplitter 215, a deformable mirror 220, a beamsplitter 225, a wavefront sensor 227 and a controller 222. It also includes a light source 248 and a camera 250. For convenience, the various light sources may be referred to as the acquisition light source 110, the WFS light source 210 and the iris imaging light source 248, respectively, to distinguish them from each other. The WFS and iris imager devices as shown as separate devices, but alternatively their functionality could be combined into a single device. The iris imaging system also includes a coarse tip-tilt steering mirror 120 controlled by controller 190, which is used as part of both the acquisition subsystem 100 and the imaging subsystem 200. In FIG. 2, the steering mirror 120 is depicted as a line through the optical beam but, for simplicity, reflection off the steering mirror is not shown (i.e., the optical path is unfolded with respect to steering mirror 120). Various lenses (or other optics) are used to collimate, focus, image or otherwise relay the optical beams throughout the system.

The acquisition subsystem 100 operates as follows. The acquisition light source 110 is the illumination for camera 150. Light produced by light source 110 reflects off beamsplitter 115, and mirror 119. Beamsplitter 115 separates light produced by source 110 that is exiting the system and light returning to the system to be imaged onto camera 150. Beamsplitter 115 could be a polarizing beamsplitter, which together with a quarterwave plate could be used to suppress back reflection and specular reflections. Beamsplitter 115 could also be a neutral beamsplitter (i.e., without polarization selectivity) for low cost and simplicity. Mirror 119 combines the optical paths of the acquisition subsystem 100 and the imaging subsystem 200 so they are generally aligned along a common optical axis. In this example, the two subsystems operate at different wavelengths, so mirror 119 is a dichroic beamsplitter that reflects the wavelengths of the acquisition subsystem 100 and passes the wavelengths of the imaging subsystem 200. The outgoing illumination from light source 110 then reflects off coarse steering mirror 120 to illuminate the acquisition subsystem 100's wider field of view 135. The field of view 135 may stare across the entire capture volume 50 or may be scanned across the capture volume. In this example, the field of view 135 is not wide enough to cover the entire capture volume in a staring mode. Rather, it is scanned across the capture volume by steering mirror 120. Subjects within the field of view 135 are represented by eyes 134, which are illuminated by the acquisition light source 110.

Eyes 134 within the field of view 135 retro-reflect light back to the coarse steering mirror 120, which directs the light to camera 150 via mirror 119 and beamsplitter 115. Camera 150 is a wide angle camera used to identify the general locations of eyes 134. In one implementation, the camera 150 is an electronic image sensor such as a CCD that periodically records discrete images of field of view 135. In one approach, the camera 150 records rapid sequences of images to monitor the movement of objects 134 within the field of view 135. The signals from the wide angle camera are analyzed by software (e.g., contained in controller 190) to identify eyes, which appear as bright circular spots due to the retro-reflections from the eyes 134. The camera 150 operates at the same wavelength as the illuminating source 110. Wavelength filters can be used to reject ambient light on the return optical path, while passing the illuminating wavelength. In addition, the light source 110 can be strobed. Synchronization of the camera 150 exposures with the source 110 strobing can also increase the isolation between imaging and guiding (or wavefront sensor) cameras. Such synchronization can also reduce the effects of background light contamination.

Once eyes 134 are identified, the controller 190 determines a plan for imaging the irises. Preferably, iris images of both eyes are captured (although not necessarily simultaneously), in order to increase the accuracy of identification. In FIG. 2, the iris 134A is being imaged. If necessary, the controller 190 directs the coarse steering mirror 120 to bring the eye of interest 134A within the narrower field of view for the imaging subsystem 200. As drawn in FIG. 2, the coarse steering mirror 120 also steers the wide field of view 135 for the acquisition subsystem 100, although this is not required. One advantage of steering the acquisition subsystem 100 and imaging subsystem 200 together is that a fixed relationship between the wavefront sensor 227 and the acquisition camera 150 is maintained.

The imaging subsystem 200 operates as follows. WFS light source 210 illuminates the eye 134A. Light produced by light source 210 reflects off beamsplitter 215, propagates through lens system 221 and mirror 119, and is directed by steering mirror 120 to the eye 134A. Since this light is coming from the imaging subsystem 200, it has a narrower field of view than the field of view 135 of the acquisition subsystem. A portion of the illuminating light enters the eye 134A, which retro-reflects light back along the same path 120-221. The return light passes through the beamsplitter 215, reflects off deformable mirror 220 and is directed by beamsplitter 225 to the wavefront sensor 227. The wavefront sensor 227, controller 222 and deformable mirror 220 form an adaptive optics loop that is driven based on the retro-reflected light from the eye 134A.

In one variation, polarization is used to distinguish retro-reflected light from a target eye 134 from glints. The illuminating light from WFS light source 210 is polarized and beamsplitter 215 is a polarization beamsplitter. The beamsplitter 215 reflects the originally polarized light, directing it to the eye 134. A quarterwave plate placed after beamsplitter 215 (e.g., between beamsplitter 215 and lens 221) rotates the polarization by ninety degrees after a double pass (i.e., one pass upon transmission from the WFS light source 210 to the eye 134A and a second pass upon retro-reflection from the eye 134A). Glints, i.e., reflections from smooth surfaces, generally preserve the polarization of the incident light and therefore will be reflected by the polarization beamsplitter 215 on the return path and will not pass through to the wavefront sensor 227. Such glints may include reflections from the objective lens 221, reflections from the front of the eye 134 or glasses, and others. The retro-reflection from the retina of the target eye 134, however, does not maintain the polarization of the incident light due to the structure of the eye, and therefore a portion of this light is transmitted through the beamsplitter to the wavefront sensor 227.

While adaptive optics can be used in many applications to correct for high order aberrations, in this case, the adaptive optics loop is used mainly for fast tracking of the eye 134A (i.e., correction of tip/tilt errors in the wavefront) and also for focus correction. This keeps the iris 134A within the narrow field of view of camera 250 and also focuses the camera (i.e., images the iris 134A onto the image plane regardless of the object distance to the iris). In this example, the light source 210 does not provide the primary illumination for camera 250. Rather, additional light sources 248 (i.e., the iris imaging light sources) provide off-axis illumination of the irises 134 for camera 250. For example, LEDs in the near infrared wavelength range can be used. The protective pigment melanin is more transparent at longer wavelengths. Thus, the details of the iris structure are more easily seen in heavily pigmented eyes by using light sources of these wavelengths. Alternatively, any other light source could be used that conforms to safety limits. The off-axis illumination generally results in higher contrast and fewer artifacts. Off-axis illumination angle also effects positioning of glints which can be deleterious to the identification accuracy if they cover portions of the iris image. Glints can also be reduced by using polarized illumination with polarizing filters for the iris camera 250. In alternate approaches, illumination for camera 250 can be provided by ambient lighting, visible or infrared flash, or combinations of these.

Traditional adaptive optics systems, such as those developed for astronomy, may be too large, complex and/or costly to be effectively used in applications such as iris imaging. However, recent advances by AOptix Technologies of Campbell, Calif., have resulted in the development of complete adaptive optics systems, including electronics, that achieve sizes smaller than a shoe box. The AOptix adaptive optics systems require less than 25 W of power and can reliably operate unattended for extended periods of time. The small size, weight and power and high reliability of the AOptix adaptive optics systems make them suitable for applications such as the iris imaging applications described herein.

In these more compact systems, the deformable mirror 220 is a deformable curvature mirror based on applying different voltages across different areas of a piezoelectric material, thus causing deformation. Various aspects of this type of deformable mirror are described and shown in U.S. Pat. No. 6,464,364, "Deformable Curvature Mirror," filed Jan. 25, 2001 and issued Oct. 15, 2002, by J. Elon Graves and Malcolm J. Northcott; U.S. Pat. No. 6,568,647, "Mounting Apparatus for Deformable Mirror," filed Jan. 25, 2001 and issued May 27, 2003, by J. Elon Graves and Malcolm J. Northcott; and U.S. Pat. No. 6,721,510, "Atmospheric Optical Data Transmission System," filed Jun. 16, 2001 by J. Elon Graves and Malcolm J. Northcott. Alternatively, the deformable mirror may be a circular deformable mirror mounted by its circumference and driven by one or more annular forces, as described in U.S. Provisional Patent Application No. 61/076,644, "Circular Deformable Mirror Mounted by its Circumference and Driven by an Annular Force," filed Jun. 29, 2008, by Malcolm J. Northcott, et al. Furthermore, the wavefront sensor 227 is a wavefront curvature sensor based on defocused pupil images. Various aspects of this type of wavefront curvature sensor are described and shown in U.S. Pat. No. 6,452,145, "Method and Apparatus for Wavefront Sensing," filed May 26, 2000 and issued Sep. 17, 2002, by J. Elon Graves and Malcolm J. Northcott; and U.S. Pat. No. 6,721,510, "Atmospheric Optical Data Transmission System," filed Jun. 16, 2001 by J. Elon Graves and Malcolm J. Northcott. All of the foregoing are incorporated herein by this reference.

In one embodiment, the iris imaging system of FIG. 2 is designed for use in airport hallways, customs checkpoints, public transportation stations, secure building lobbies, and the like. Standoff distances (i.e., distances to the subjects) of up to at least 10 meters would enable the scanning of a large room or hallway to identify the occupants. For example, a device could be placed in the vicinity of the departure and/or arrival screen in an airport. The system would then be able to identify anyone attempting to read the screen contents.

For this specific design, the acquisition subsystem 100 has a field of view 135 of approximately 12 degrees, resulting in a capture volume 50 measuring approximately 2 m×2 m×2 m at a 10 m range (without scanning). The acquisition light source 110 is a light-emitting diode (LED) having a wavelength in the range of 750 to 980 nm. Shorter wavelengths give better sensor quantum efficiency, but wavelengths longer than approximately 890 nm are required for invisible operation. Longer wavelengths are also possible but require more expensive (not silicon) detectors. LED sources are generally preferred. Laser sources are problematical due to eye safety considerations, but could be used with careful engineering. Gas discharge lamps could also be used under some circumstances. Thermal sources such as tungsten lights and arc lamps could also be used but would be inefficient due to the requirement for wavelength filtering.

In this specific design, the illuminating wavelength used by the acquisition subsystem 100 is different than that used by the imaging subsystem 200, so mirror 119 can be wavelength-selective to separate the light for the acquisition subsystem 100 from that for the imaging subsystem. The acquisition camera 150 is an infrared enhanced monochrome TV camera with a resolution of approximately 720×500 pixels. The camera 150 operates at a 30 Hz frame rate.

With respect to the imaging subsystem 200, the resolution requirements drive the design of the iris imaging system 200. Consider a resolution requirement of 75 microns per pixel. Assuming diffraction limited performance, the required aperture diameter d is given by $d=\lambda z/r$, where z is the object distance and r is the required spatial resolution. For example, assuming $\lambda=0.82$ µm, and z=10 m, the required aperture is 11 cm. As another example, a 100 µm spatial resolution can be achieved at a visible wavelength of 0.5 µm at a 10 m standoff distance with a diffraction limited 5 cm aperture. However, infrared wavelengths are generally preferred for iris imaging due to the enhanced contrast observed at longer wavelengths.

The diffraction limited resolution requirement and large aperture also lead to a limited depth of field. If the geometric image spread due to focus depth of field is set to be less than half of the diffraction limit, then the depth of field l is given by $l=r^2/\lambda$. The 0.82 µm example yields a depth of field of approximately 7 mm. The 0.5 µm example yields a depth of field of approximately 2 cm. Depth of fields on the order of a few millimeters or a few centimeters makes focusing on moving objects difficult. Hence, it is advantageous for the adaptive optics loop to implement fast focus correction as well as fast tracking. With the adaptive optics augmented iris imaging system, images can be taken within a few milliseconds of identifying a target. Thus, the use of adaptive optics can increase the speed and accuracy of image capture for applications involving uncooperative or minimally cooperative targets.

Focus adjustment can also be achieved using other variations and approaches. For example, a variable focus lens or use of a variable refractive index element can be used to adjust the focus. Electro-mechanical lens position adjustment and movement of the camera 250 can also be used for focus adjustment, however use of a single mechanically driven lens does not give image scale invariance. In addition, focus wavefront sensing can be based on image contrast measurements and dithering, or by use of a dedicated focus wavefront sensor, or by measuring the distance to the eye using time of flight of an optical or acoustic pulse, or by using stereoscopic imaging.

Continuing with the specific example described above, the WFS light source 210 used in the iris imaging system 200 can be chosen to illuminate the eye so that the target individual is unaware of the process. LEDs having wavelengths in the range of 750 to 980 nm are generally preferred (and greater than approximately 890 nm for invisible operation), but other sources can be used as described above. Filling the telescope aperture with the illumination light as shown in FIG. 2 is advantageous, since it ensures that the pupil is fully illuminated by the eye reflection. The iris imaging light sources 248 are also preferably LEDs. Iris imaging standards currently specify wavelengths around the 850 nm range.

In this example, the WFS illuminating wavelength (used by the wavefront sensor 227) is also selected to be different from the illumination used to image the irises by camera 250. Hence, the beamsplitter 225 is dichroic to increase efficiency. However, these separations in wavelength are not required. The different beams can be separated using other techniques. For example, the iris imaging illumination and WFS illumination can be distinguished by time instead. The WFS LED 210 can be flashed synchronously with a WFS chopper (not shown in FIG. 2), and the iris imaging illumination 248 flashed to fill the dead time when the wavefront sensor 227 is not integrating signal. The iris imaging camera 250 preferably is a high quality monochrome imager. Due to the high speed tracking, this imager 250 can have a relatively small number of pixels, for instance a standard 640×480 video imager is convenient. For the iris imaging camera 250, high quality, high quantum efficiency and low signal to noise are relatively more important than resolution. The acquisition camera 150 will generally have a separate illumination system 110. If interference occurs between the acquisition illumination 110, the iris imaging illumination 248 and/or the fine tracking illumination 210, various techniques can be used to provide isolation, including for example techniques based on wavelength, polarization, temporal separation and/or angular or spatial separation.

Figure 3:
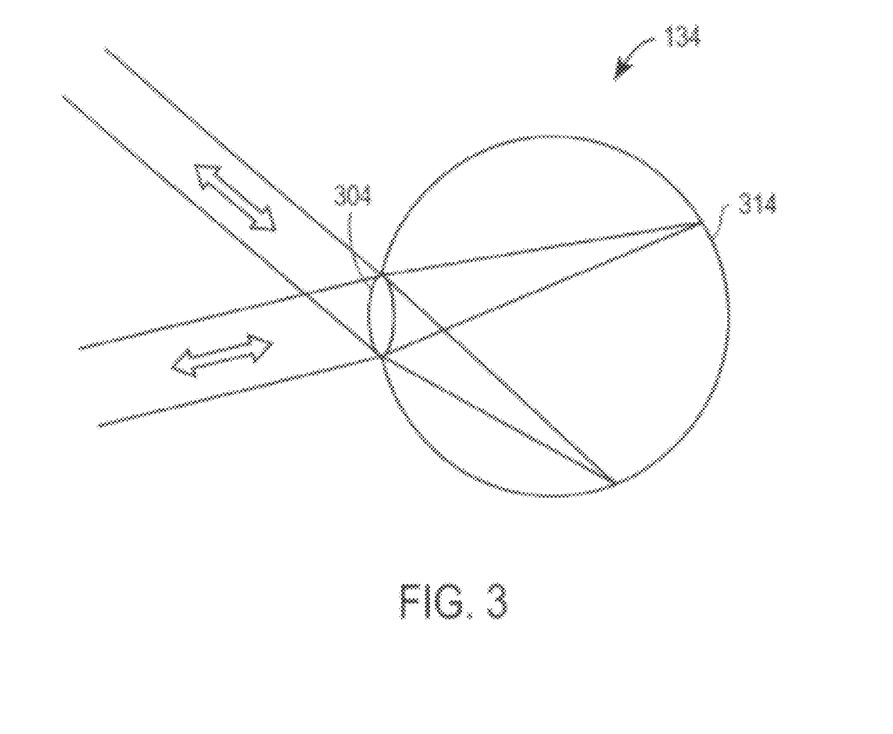
FIG. 3 is an illustration of retro-reflection from the eye.

The example of FIG. 2 is based on retro-reflection from the eye. FIG. 3 is an illustration of retro-reflection from the human eye. The intrinsic geometry of the eye causes it to act as a retro-reflector. Light that enters the eye lens 304 is focused onto the retina 314. Any light scattered by the retina back towards the lens 404 retraces its path out of the eye. Because the retina is in the focal plane of the eye lens, light is strongly directed in the backscatter direction. As FIG. 3 shows, light enters the eyeball through the pupil and reflects from the back curved surface of the retina 314. It is this back-reflection from the retina 314 that can be used to drive the fine tracking system in the imaging subsystem (e.g., the wavefront sensor in the adaptive optics loop). Also, the illustration of FIG. 3 shows that the illumination need not come from a face-on aspect to create a retro-reflection. Thus, the subject need not stare directly into the iris imaging camera for the acquisition and imaging system to work.

Figure 4:
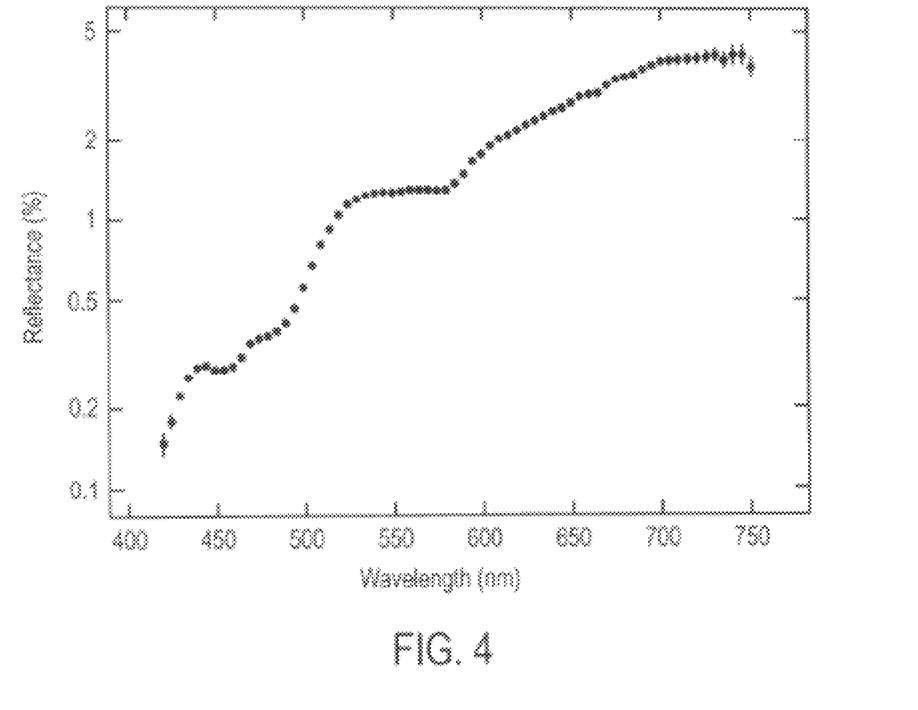
FIG. 4 is an illustration of a typical reflectance spectrum of a human eye.

FIG. 4 is an illustration of a typical reflectance spectrum of a human eye. This graph was originally presented in the thesis of Niels Zagers, University of Utrecht. The reflectance shows a strong peak towards the infrared. Using a wavelength of 750 nm (CD read laser wavelength), a reflectivity of 4% of the white Lambertian diffuser value is expected. The back reflection property is stronger in the red and near IR (around 800 nm) wavelengths, since melanin which is found in the retina, is less absorbing at red wavelengths. At a 750 nm or longer wavelength, the subject would only see faint illumination since this is outside the nominal visible region. At 880 nm or longer wavelength the light source will be essentially invisible.

The following example demonstrates how retro-reflected light from an eye 234 can be used in closed loop operation of an adaptive optics system. A subject at a 10 m distance can be illuminated with 0.1 mW of power to the eye, which is well within the eye safety limit. In this example, the retro-reflected light is expected to be approximately $6.4 \times 10^{-13}$ W/cm$^2$. Assuming a 5 cm imaging lens is used to achieve a 100 micron spatial resolution, approximately $1.2 \times 10^{-11}$ W is captured on the wavefront sensor. This corresponds to a photon flux of approximately $5 \times 10^7$ photons per second. In one embodiment, a low order adaptive optics system running at a relatively slow rate is used. For example, a 19 actuator adaptive optics system updated at 1 KHz, provides approximately 2500 photons per actuator per update. A CCD type detector with better than 50-electron read noise and 50% quantum efficiency will provide sufficient signal to noise ration for closed loop operation of the adaptive optics system. For comparison, better than 10-electron read noise and 90% quantum efficiency is routinely achieved for scientific grade CCD imaging. Thus, the retro-reflected light can be used to derive the feedback signal to support adaptive optics-assisted fine tracking and imaging.

Advantages of using the eye as a retro-reflector to drive the wavefront sensor include low cost and long range. The low cost is due to the ability to use an inexpensive silicon detector as the wavefront sensor and inexpensive LEDs as light sources. An adequate signal is achieved even at long ranges due to the strong directionality of the retro-reflection. However, the retinal retro-reflection does not appear as a point source, so higher dynamic range detectors are used to generate an accurate wavefront signal.

Figure 5:
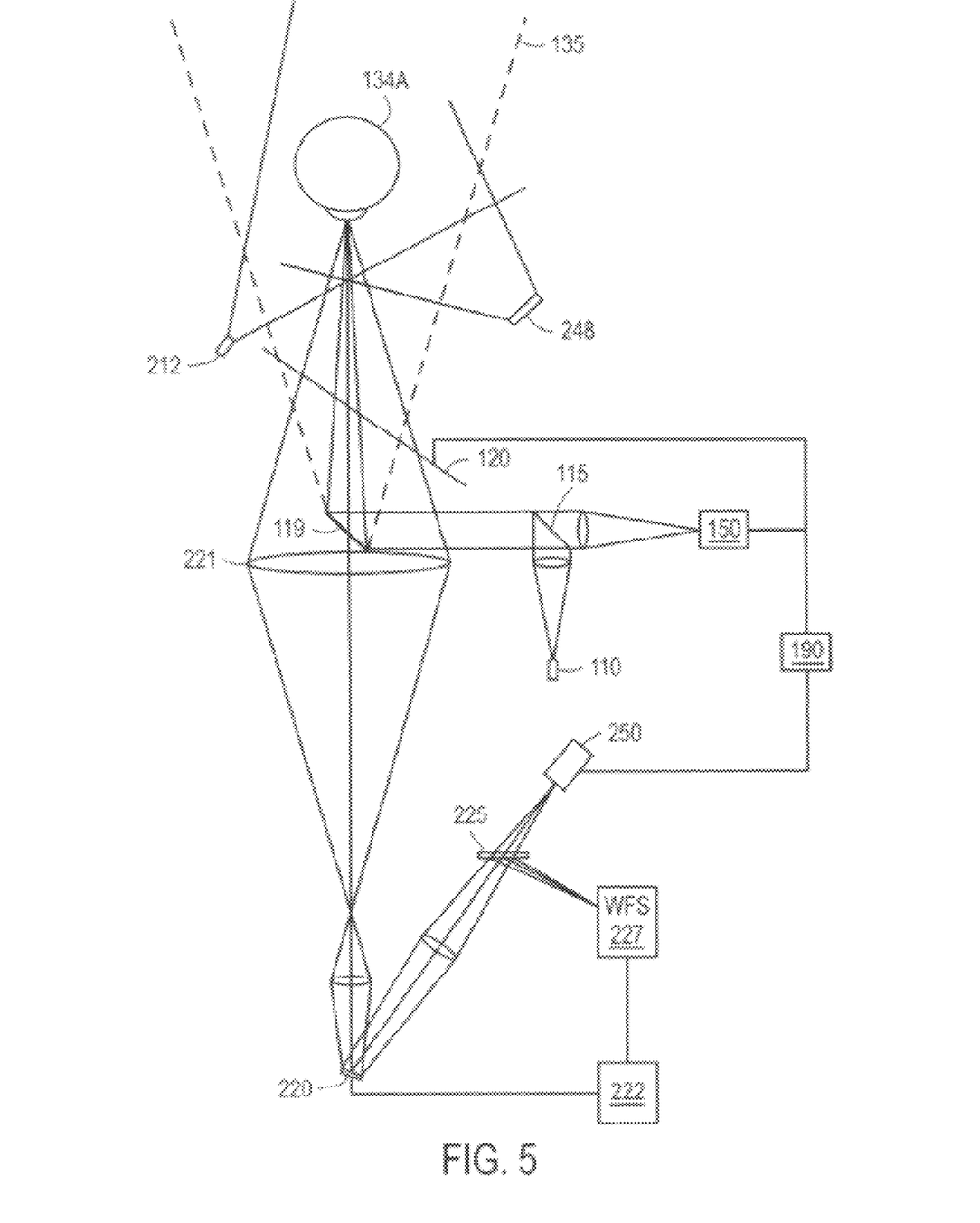
FIG. 5 is an illustration of another iris imaging system, based on glint from the eye, in accordance with an embodiment of the invention

In the example of FIG. 2, the reflection from the eye was a retinal retro-reflection. Alternatively, the front surface of the eye acts as a partial mirror with about 4% reflectivity. Reflections from this surface form a glint that can be used to steer the imaging subsystem 200 instead of the retro-reflection. For example, the system of FIG. 2 can be modified so that the light source 210 illuminates eye 134A, but the wavefront sensor 227 is driven by a glint reflection from the eye rather than a retro-reflection. Since glints can be produced by off-axis illumination, the light source 210 can be moved off-axis or even outside the telescope 221 for the imaging subsystem 200. In the example of FIG. 5, the light source 210 is replaced by an external light source 212. This source 212 is positioned at locations more like illuminators 248 but still produces a glint for telescope 221. In addition, the glint looks like a de-magnified image of the light source, so it tends to be more like a point source. A resulting advantage is that the size and shape of the glint is not a strong function of the distance to the subject.

One advantage of driving the wavefront sensor from the glint of the eyeball is that there is no limitation on distance over which glints from eyeballs can be used. Also, a point-like source does not require a wavefront sensor with a high dynamic range. However, glints return less light than retro-reflections from eyes, so more wavefront sensor sensitivity or a higher illumination flux may be required.

Figure 6:
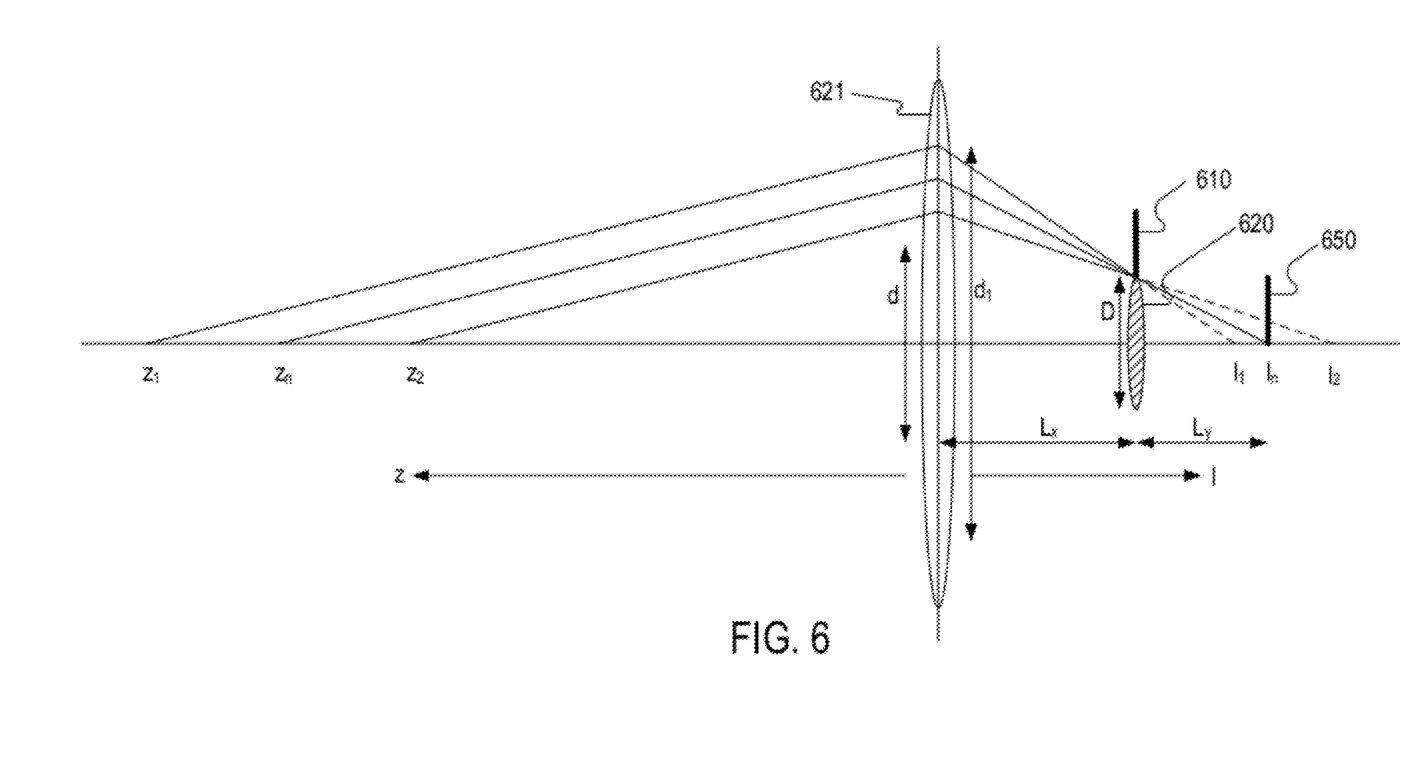
FIG. 6 is an illustration of an example optical imaging system, in accordance with an embodiment of the invention.

As stated above, the imaging subsystem 200 is designed so that the focus correction and placement of the aperture stop result in constant image scale and constant image spatial resolution. FIG. 6 illustrates the general principle of this approach using a simple example system. In this example, the optical system includes an objective lens 621, an active focus element 620 (e.g., a deformable mirror) and an image plane 650 (e.g., the location of the camera's sensor array). The distance from the objective lens 621 to the active focus element 620 is $L_x$, and the distance from the active focus element 620 to the image plane 650 is $L_y$.

Let z be the distance to the object. The system is designed to image objects that fall within a range of object distances $z_1$ to $z_2$. These images are all formed at the image plane 650, regardless of the object distance z. Without the active focus element 620, the objective lens 621 would image objects at different object distances z to different image distances l. As shown by the dashed lines in FIG. 6, the object at $z_1$ would be imaged to image distance $l_1$ and the object at $z_2$ would be imaged to image distance $l_2$. Since this example assumes first order optics, the object distance and uncorrected image distance satisfy the simple lens formula:

$$l = \frac{zf}{z-f} \tag{1}$$

where f is the focal length of the object lens 621.

However, the active focus element 620 introduces a variable amount of additional optical power, moving the image plane backwards or forwards to location 650, as shown by the solid line in FIG. 6. The subscript n indicates the neutral position for the active focus element 620. At this position, the active focus element 620 introduces no optical power. The objective lens 621 images the object at $z_n$ to image location $l_n$. From the geometry, $l_n = L_x + L_y$. The neutral position may be selected to reduce the dynamic range required from the active focus element 620. In one embodiment, the amount of focus adjustment required to be performed by the active focus element is used to determine a measurement of the object distance.

In this example, the aperture stop 610 is located at the active focus element 620. For example, the aperture stop 610 may be defined by the clear aperture of the active focus element 620. Variable D is the size of the aperture stop 610 as projected onto the last element 620. In this example, the stop 610 is located at the active focus element 620 so D is constant and does not vary with z. Variable d is the size of the aperture stop 610 as projected onto the first element, objective lens 621 in this case. In the geometry of FIG. 6, the objective lens 621 is assumed to be underfilled, so that d varies with z.

Given the above operation, the goal is to select $L_x$ so that both the image scale and the image spatial resolution do not vary with object distance z. In this example, this is equivalent to requiring that both the image spatial resolution $\sigma_i$ and the object spatial resolution $\sigma_o$ do not vary with object distance z.

Assume that the range of object distances $z_1$ to $z_2$, wavelength $\lambda$, and focal length f of the objective lens are given.

First, note that the image spatial resolution is given by $$\sigma_i = \lambda L_y / D \tag{2}$$

However, both $L_y$ and D are constants so $\sigma_i$ is also a constant and this condition is satisfied.

The object spatial resolution is given by $$\sigma_o = \lambda z / d \tag{3}$$

To meet this condition, z/d must be a constant. That is, the aperture d must be linearly proportional to the object distance z, as is shown in FIG. 6.

To derive the condition where z/d is a constant, note that the aperture d is given by $$d = \frac{lD}{l - L_x} \tag{4}$$

Substituting Eqn. 4 into Eqn. 3 yields $$\sigma_o = \frac{\lambda z (l - L_x)}{lD} \tag{5}$$

Substituting Eqn. 1 into Eqn. 5 then yields $$\sigma_o = \frac{\lambda f L_x + \lambda z (f - L_x)}{fD} \tag{6}$$

From Eqn. 6, it can be seen that the object spatial resolution will be constant with respect to object distance z if $f = L_x$. In other words, the condition of constant object spatial resolution is met if the aperture stop 610 and active focus element 620 are located at the back focal plane of the objective lens 621. This approach is generally more useful for systems operating well away from infinite conjugate.

Note that this condition does not depend on the location of the image plane 650 and, at least to first order, the image plane 650 can be located anywhere without affecting the constant object spatial resolution. In addition, additional imaging optics can be used to relay the image onto the actual image plane 650. However, in practical applications, some image plane 650 locations are preferred over others. For example, for significantly displaced image planes 650, there may be a range of z for which the dynamic range of the active focus element 620 is not sufficient to reach the condition of constant object spatial resolution. In these cases, the image plane 650 could be moved to a position where the condition of constant object spatial resolution could be fulfilled by the active focus element 620. Furthermore, considerations of spatial sampling, field of view and field distortion typically will also favor certain locations of image plane 650.

The position of the image plane 650 typically is selected somewhere around the range $l_1$ to $l_2$ in order to relax the requirements on the active focus element 620. For example, if the active focus element 620 can introduce both positive and negative power, then the neutral position $l_n$ preferably is selected between $l_1$ and $l_2$ in order to reduce the range required from the active focus element. If the active focus element 620 can introduce only positive or only negative power, then the neutral position $l_n$ preferably is selected to one side of the range $l_1$ to $l_2$ so as to stay within the operating range of the active focus element. If the active focus element has some bias amount of optical power and varies around this bias point, then the neutral position $l_n$ will move farther away from the range $l_1$ to $l_2$ in order to accommodate the additional optical power introduced by the active focus element.

The aperture variables D and $d_1$ (the maximum aperture on the objective lens) are related by Eqn. 4:

$$d_1 = \frac{l_1 D}{l_1 - L_x} \quad (7)$$

where $l_1$ can be computed using Eqn. 1. Thus, for a given size of active focus element D, Eqn. 7 determines the corresponding maximum aperture $d_1$ on the objective lens. Conversely, for a given desired maximum aperture $d_1$, Eqn. 7 determines the size D of the active focus element.

The above approach meets the goals of constant object spatial resolution independent of object distance. However, the objective lens typically will be slow. This in return results in a long path length for the overall system.

Table 1 calculates the path length of various optical systems, assuming a 25 mm maximum objective diameter ($d_1$) and a focus range from 1.5 m to 2.5 m. The focus range is defined by the values of $l_1$ and $l_2$ (i.e., the image distances without correction by the active focus element 620). This arrangement gives a constant 224 Nyquist sampled pixels across a 9.5 mm diameter iris, independent of the object distance to the iris. A Nyquist sampled pixel in a diffraction limited system is defined as the pixel which has a size which is half the size of the full width at half maximum (FWHM) of the diffraction limited point spread function (PSF). Nyquist sampling is met when at least two pixels span the FWHM of the PSF.

TABLE 1

Sample Design

| Diameter D of deformable mirror (DM) | Focal length f of objective lens | Distance $L_y$ from DM to image plane | Total path length ($L_x + L_y = f + L_y$) | Required DM stroke (diopters) |
| --- | --- | --- | --- | --- |
| 11 mm | 1.1 m | 1.18 m | 2.28 m | +/−0.37 |
| 10 mm | 1.0 m | 0.89 m | 1.89 m | +/−0.44 |
| 9 mm | 0.9 m | 0.66 m | 1.56 m | +/−0.54 |
| 8 mm | 0.8 m | 0.48 m | 1.28 m | +/−0.69 |
| 7 mm | 0.7 m | 0.34 m | 1.04 m | +/−0.90 |
| 6 mm | 0.6 m | 0.24 m | 0.84 m | +/−1.23 |
| 5 mm | 0.5 m | 0.15 m | 0.65 m | +/−1.76 |
| 4 mm | 0.4 m | 0.09 m | 0.49 m | +/−2.76 |

As shown in Table 1, the design strongly favors a smaller DM, but this in turn requires significantly higher stroke from the DM. For the 25 mm maximum pupil diameter, the results shown in Table 1 indicate that a 5 mm DM pupil is a good tradeoff between shorter total path length and less stroke for the deformable mirror.

If the maximum pupil size is expanded to 30 mm, a similar analysis yields a design using a 6 mm DM with +/−1.8 diopters of stroke and a total optical path length of 0.62 m. The 30 mm configuration gives 270 Nyquist sampled pixels across a 9.5 mm iris.

Figure 7:
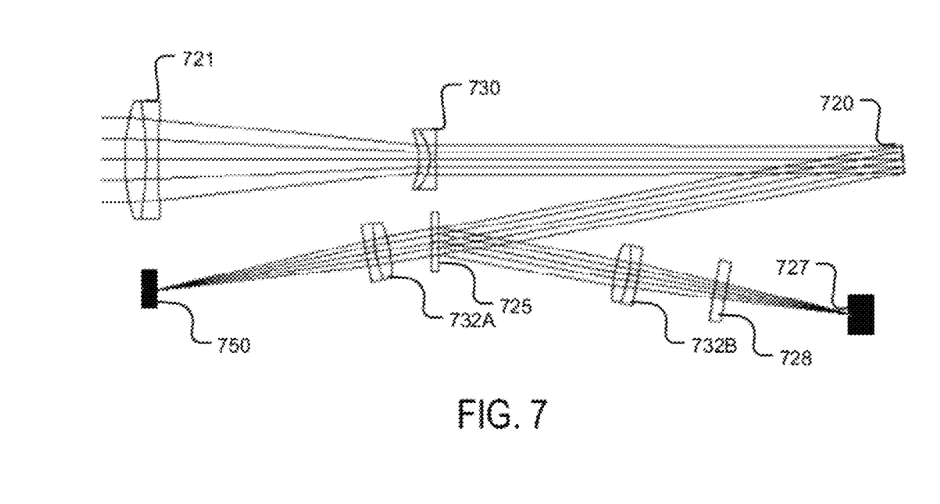
FIG. 7 is an illustration of an optical imaging system incorporating the approach described with respect to FIG. 6.

FIG. 7 is an illustration of an optical imaging system that applies the approach described with respect to FIG. 6, to the iris imaging systems shown in FIGS. 2 and 5. Both FIGS. 2 and 5 include a camera 250 that captures iris images, and an adaptive optics loop with a beamsplitter 225, wavefront sensor 227 and deformable mirror 220 for active steering and focusing of the camera. In FIG. 7, the corresponding components are camera 750, and the adaptive optics loop with beamsplitter 725, wavefront sensor 727 and deformable mirror 720. The deformable mirror 720 acts as the aperture stop for the system. Element 728 is a cylindrical lens used with this particular astigmatic wavefront sensor 727. Element 721 is the objective lens for this system.

In the approach described with respect to FIG. 6, the deformable mirror 720 would be located at the back focal plane of the objective lens (i.e., one focal length behind the objective lens). FIG. 7 shows a different implementation. The deformable mirror 720 is not literally located at a physical distance of one focal length behind the objective lens 721, but it is located at the optical equivalent. That is, the deformable mirror 720 is conjugated to the infinite focus of the objective lens 721. It is located at a conjugate to the back focal plane. An additional lens pair 730-732 is inserted into the optical path, with the deformable mirror 720 located between the two lenses in the pair. In FIG. 7, because of the beamsplitter 725, the second lens is duplicated, once 732A for the camera 750 and once 732B for the wavefront sensor 727. Table 2 lists the physical diameter and focal length for the main lensing elements in FIG. 7.

TABLE 2

| Lens parameters | | |
| --- | --- | --- |
| Lens | Diameter (mm) | Focal Length (mm) |
| Objective lens 721 | 50 mm | 170 mm |
| Negative lens 730 | 25 mm | −65 mm |
| Imaging lens 732 | 25 mm | 100 mm |

The lens pair 730-732 expands the physical space corresponding to the infinite conjugate plane for the deformable mirror 720. The additional lenses 730-732 can also be used to compensate for additional aberrations, for example in order to increase the field of view. The addition of negative lens 730 also mitigates the long path length disadvantage of the simple design of FIG. 6.

In one approach, for an object located at $z_n$ (i.e., the neutral scenario), the negative lens 730 produces a collimated beam that is imaged onto the camera 750 by imaging lens 732A. In the neutral position, the deformable mirror 720 does not change the collimated state of this optical beam. At other object positions, the deformable mirror 720 introduces optical power that collimates the beam leaving the deformable mirror. Using the deformable mirror 720 to produce a collimated beam also increases the functionality and flexibility of the design, for example simplifying the task of the wavefront sensor 727.

The above conditions also yield constant brightness. If d is proportional to z, then the area of the entrance pupil is proportional to $z^2$, which cancels out the z dependence from the inverse square law for point sources. Thus, image brightness is constant for constant object brightness.

Figure 8:
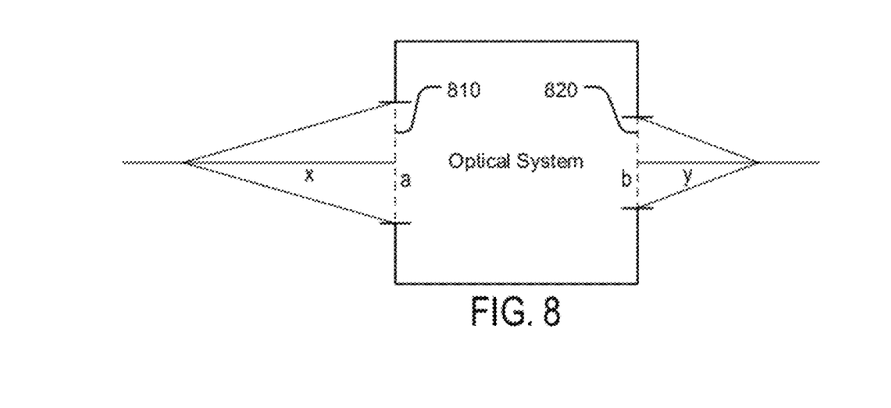
FIG. 8 is a generalized illustration of an optical imaging system, in accordance with an embodiment of the invention.

FIGS. 6 and 7 describe two examples systems. Other variations will be apparent. FIG. 8 is a more generalized diagram of such a system. The optical system is represented by its entrance pupil 810 and exit pupil 820. An object located at a distance x from the entrance pupil will have an entrance pupil 810 of size a, corresponding exit pupil 820 of size b, and produce an image located at image distance y from the exit pupil. The variables a, b and y may all vary as a function of x. If they vary such that a/x and b/y are both constant, then $\sigma_o$ and $\sigma_i$ will both be constant, yielding both image scale invariance and image spatial resolution invariance.

The examples above consider a situation of perfect invariance. As another variation, the variance can be reduced even though complete invariance is not achieved. In FIG. 6, the aperture stop 610 and active focus element 620 need not be located exactly at the back focal plane. Positioning these elements closer to the back focal plane will reduce the amount that the optical magnification varies with object distance. This can be beneficial even if full invariance is not implemented.

In a conventional system without an active focus element 620, magnification is inversely proportion to object distance z. In the perfectly invariant system with the active focus element 620 positioned at the back focal length, the magnification is independent of the object distance. In other variants, the active focus element 620 can be positioned at intermediate positions other than these two extremes, resulting in a magnification is not independent of object distance but that varies more slowly than in the conventional case. In one embodiment, this can result in a simplification of iris images due to a small range of expected iris image sizes. For perfectly invariant systems, absolute iris image scales can also be determined. In some implementations, the size of an iris is also of some biometric significance.

Put in another way, in a conventional system, the active focus element 620 (e.g., a deformable mirror) typically is located in the pupil plane of the system. However, in the perfectly invariant system of FIG. 6, the deformable mirror is located at an infinite conjugate image plane. In other variants, the active focus element can be positioned at intermediate positions other than these two extremes, resulting in a magnification is not independent of object distance but that varies more slowly than in the conventional case.

For example, in the iris imaging application, capture volumes can include standoff ranges of 50 cm to 1.2 m, 1.5 m to 2.5 m, or 5 m to 10 m. The ratio of closest to farthest range is restricted by the focus power of the deformable mirror, and the aberration performance of the optics, but typically a factor of 2 to 3 is relatively easy to achieve. Larger ranges are possible, but may not be necessary in practice. To prevent excessive variation in the image scale, the active focus element 620 is preferably positioned to achieve the required variation in image. The maximum image scale variation will be set by the particular system constraints. Typical constraints will be the minimum resolution on the iris, the maximum size of the object such that it fits on the imaging detector. Other design considerations, such as the requirement to correct higher order aberrations using the same adjustable element, may also constrain the level of scale nulling that can be practically achieved. One advantage of this approach is that the iris image will be well-matched in size to the sensor array over the range of possible standoffs.

Furthermore, the concepts and systems described above can be used for many applications other than iris imaging. For example, it can be used in any computer vision application where the absolute size of objects is important, and/or where it is important that the field of view as measured in the object plane be independent of object distance, and/or where it is important that detector dynamic range be optimally used to avoid detector saturation (e.g., where the inverse square law is a problem).

The concepts could also be used as a projector which maintains projected image size and brightness in the image plane independent of the distance to the projected image plane. This could have potential uses in photo lithography, laser welding, laser surgery or other applications where a specific illumination intensity and spatial distribution in the image plane is desired independent of the projected image distance.

Therefore, although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. An iris imaging system comprising a camera that captures images of irises within a predefined capture volume with sufficient resolution for biometric identification, the camera including:
    an optical system including an objective lens, and an adaptive optics loop that auto-focuses an image of an iris onto an image plane located at a fixed position based on a reflection of light from an eye containing the iris, with an image scale and an image spatial resolution that is constant regardless of a standoff distance to the iris, the adaptive optics loop comprising:
        a deformable mirror that adjusts a wavefront of the eye reflected light;
        a wavefront sensor that senses the wavefront of the eye reflected light; and
        a controller coupled between the deformable mirror and the wavefront sensor that adjusts the deformable mirror based on the sensed wavefront; and
    a sensor array located at the image plane.

2. The iris imaging system of claim 1, wherein the deformable mirror is located one focal length behind the objective lens.

3. The iris imaging system of claim 1, wherein the deformable mirror is located at an optical conjugate to the infinite focus of the optical system.

4. The iris imaging system of claim 1, wherein an aperture stop is located at the deformable mirror.

5. The iris imaging system of claim 1, wherein a size of an entrance pupil of the optical system is linearly proportional to a distance from the entrance pupil to the iris.

6. The iris imaging system of claim 1, wherein the deformable mirror is a deformable curvature mirror based on applying different voltages across different areas of a piezoelectric material.

7. The iris imaging system of claim 1, wherein the deformable mirror is circular deformable mirror mounted by its circumference and driven by one or more annular forces.

8. The iris imaging system of claim 1, wherein the wavefront sensor is a wavefront curvature sensor based on defocused pupil images.

9. The iris imaging system of claim 1, wherein the iris imaging system has a speed to acquire and image at least one iris per second.

10. The iris imaging system of claim 1, wherein the camera captures images of
    irises with a spatial resolution of 200 microns or better.

11. The iris imaging system of claim 1, wherein the camera captures images of
    irises with a spatial resolution of 100 microns or better.

12. The iris imaging system of claim 1, wherein the camera captures images of
irises with a spatial resolution of 75 microns or better.

13. The iris imaging system of claim 1, wherein the iris imaging system can cover a capture volume of at least 1 cubic meter.

14. The iris imaging system of claim 1, wherein the camera can capture iris images at a standoff of at least 2.5 m.

15. The iris imaging system of claim 1, wherein the camera can capture iris images at a standoff of at least 5 m.

16. The iris imaging system of claim 1, wherein image brightness is constant for constant object brightness.

17. The iris imaging system of claim 1, wherein a required focus adjustment is used to determine a measurement of iris standoff distance.

* * * * *